(12) United States Patent
Busch et al.

(10) Patent No.: US 9,431,172 B2
(45) Date of Patent: Aug. 30, 2016

(54) BIAXIALLY ORIENTED ELECTRICAL INSULATING FILM

(75) Inventors: Detlef Busch, Saarlouis (DE); Thilo Mohr, Homburg (DE)

(73) Assignee: Borealis Technology Oy (FI)

( * ) Notice: Subject to any disclaimer, the term of this patent is extended or adjusted under 35 U.S.C. 154(b) by 538 days.

(21) Appl. No.: 12/439,238

(22) PCT Filed: Aug. 29, 2007

(86) PCT No.: PCT/EP2007/058985
§ 371 (c)(1),
(2), (4) Date: Feb. 27, 2009

(87) PCT Pub. No.: WO2008/034694
PCT Pub. Date: Mar. 27, 2008

(65) Prior Publication Data
US 2010/0003489 A1    Jan. 7, 2010

(30) Foreign Application Priority Data
Aug. 31, 2006 (EP) .................................... 06119897

(51) Int. Cl.
| B32B 5/00 | (2006.01) |
| H01G 4/18 | (2006.01) |
| B32B 27/32 | (2006.01) |
| H01B 3/44 | (2006.01) |

(52) U.S. Cl.
CPC ................ *H01G 4/18* (2013.01); *B32B 27/32* (2013.01); *H01B 3/441* (2013.01); *Y10T 428/31678* (2015.04); *Y10T 428/31692* (2015.04); *Y10T 428/31909* (2015.04)

(58) Field of Classification Search
CPC ........ B32B 27/08; B32B 27/32; H01G 4/18; H01B 3/18; H01B 3/30; H01B 3/441; C08F 10/06; C08F 210/06; C08F 110/06; C08F 2500/15; C08L 23/10; C08L 2205/02; C08L 2205/025; Y10T 428/31909; Y10T 428/31692; Y10T 428/31678
USPC ....................................................... 428/220
See application file for complete search history.

(56) References Cited

U.S. PATENT DOCUMENTS

| 4,622,237 A | 11/1986 | Lori |
| 5,252,389 A | 10/1993 | Schmidt et al. |
| 5,362,808 A | 11/1994 | Brosius et al. |
| 5,461,119 A | 10/1995 | Marczinke et al. |
| 5,724,222 A * | 3/1998 | Hirano et al. ................ 361/311 |
| 6,127,042 A | 10/2000 | Tamic |
| 6,537,652 B1 * | 3/2003 | Kochem et al. .............. 428/220 |
| 2002/0032295 A1 * | 3/2002 | Peiffer et al. ............... 526/348.1 |
| 2003/0176555 A1 | 9/2003 | Watanabe et al. |
| 2004/0053064 A1 * | 3/2004 | Masuda et al. ............... 428/500 |
| 2004/0171782 A1 | 9/2004 | Lin et al. |
| 2008/0042323 A1 * | 2/2008 | Inukai et al. ............... 264/328.1 |

FOREIGN PATENT DOCUMENTS

| DE | 10300146 A1 | 7/2003 |
| EP | 0142724 A2 | 5/1985 |
| EP | 0190889 A1 | 1/1986 |
| EP | 0384431 A2 | 8/1990 |
| EP | 0450342 A2 | 10/1991 |
| EP | 0497160 A1 | 8/1992 |
| EP | 0574801 A1 | 12/1993 |
| EP | 0574804 A2 | 12/1993 |
| EP | 0678527 A2 | 10/1995 |
| EP | 0688817 A1 | 12/1995 |
| EP | 0776926 A2 | 6/1997 |
| EP | 0909638 A2 | 4/1999 |
| EP | 1398344 A1 | 3/2004 |
| JP | 59-063608 A | 4/1984 |
| JP | 2004-161799 A | 6/2004 |
| JP | 2006063186 A | 3/2006 |
| JP | 2006-093688 A | 4/2006 |
| WO | WO-97/05634 A1 | 2/1997 |
| WO | WO 2006057066 A1 * | 6/2006 |

OTHER PUBLICATIONS

Wang et al. "Crystallization Behavoir and Crystal Morphology of Linear/Long Chain Branching Polypropylene Blends." Polymer Journal, vol. 40, No. 5, pp. 450-454. Mar. 19, 2008.*
Hayashi et al., "Heptad configurational anaylsis of 13C NMR spectra in highly isotactic polypropylene", Polymer, vol. 29, pp. 138-143, (Jan. 1988).
Fass et al., "New BOPP Capacitor Film for Metallization with Improved Performance at Higher Temperatures", Electronics Information & Planning, pp. 103-109, (Dec. 2000).
Ecole Polytechnique de Louvain, "Determination of the molecular weight (MW) and molecular weight distribution (MWD) of PP by size exclusion chromatography (SEC)", Universitè Catholique de Louvain, pp. 1-6, (Apr. 14, 2001).
Borealis, "PP Products for Biaxially Oriented Film", (2001).
Odian, "Principles of Polymerization", 4th Edition, pp. 636-637 (2004).
Borealis, "Polypropylene Borclean HC300BF", (Sep. 24, 2010).

* cited by examiner

*Primary Examiner* — Nancy Johnson
(74) *Attorney, Agent, or Firm* — Drinker Biddle & Reath LLP

(57) ABSTRACT

The invention relates to a biaxially oriented electrical insulating film which is constituted of a base layer and at least one cover layer, the base layer containing a mixture from a polypropylene P1 and a polypropylene P2 which is different therefrom, the polypropylene P1 being a linear polypropylene and having an Mw/Mn>5 and a mesopentadene isotactic index of at least 95% and the polypropylene P2 having a long-chain branching.

21 Claims, No Drawings

BIAXIALLY ORIENTED ELECTRICAL INSULATING FILM

RELATED APPLICATIONS

This application is a national stage application (under 35 U.S.C. §371) of PCT/EP2007/058985, filed Aug. 29, 2007, which claims benefit of European Application No. 06119897.4, filed Aug. 31, 2006.

The invention concerns a polypropylene film with improved properties for use as an electrical insulating film in condensers.

EP-A-0 776 926 describes a biaxially-oriented film for use in condensers, which has a total shrinkage of 1-4% in the longitudinal and lateral direction at 120° C. The film consists of a high-isotactic polypropylene and has an isotacticity of 98-99.5%, and an isotactic pentad fraction of >99%.

In WO 97/05634, a condenser is described, the dielectric of which consists of a polypropylene film with an elasticity modulus of greater than 1500 Mpa, a flow temperature of over 110° C. and a vicat softening point of greater than 150° C. The film has, among other things, an improved shrinkage property in the longitudinal direction between 100° C. and 150° C. The shrinkage behaviour in the lateral direction is not described.

EP 1 398 344 A1 describes a method for production of biaxially-oriented polypropylene film. The polypropylene possesses a special melt strength in combination with a selected MFI. Introducing the films in the packaging sector is described. Other uses are not mentioned.

JP 2006-63186 describes films made of polypropylenes with a narrow molecular weight distribution and high isotacticity. According to this teaching, highly isotactic polypropylenes with a Mw/Mn of <5 are advantageous with regard to the temperature stability of the film produced out of them, but the stretchability is difficult, because of the increased crystallinity. In order to solve this problem, the highly isotacic polypropylene raw material is mixed with an HMS polypropylene. The advantages of the highly isotactic, narrowly distributed raw material are retained, the stretchability of the mixture is substantially better and the films have a better thickness consistency. Moreover, it is described that the films from this mixture have an improved breakdown voltage.

The dielectric breakdown voltage is an important quality criterion for the electrical insulating film. The breakdown voltage is the maximum voltage to which the condenser can be subjected. If the breakdown voltage is reached, then breakdowns occur in the film, breakdowns which adversely affect the capacitance and can lead to a total failure of the condenser. The maximum electrical breakdown voltage at a given temperature is dependent on both the film thickness and on the temperature stability of the electrical insulating film. The breakdown voltage which can be reached decreases with increasing temperature. As a result, condensers are set to a specific maximum usage temperature, which should not be exceeded. So failures of the condenser can come about from breakdowns if the usage temperature is exceeded. According to the prior art, these deficiencies can only be compensated by an increased film thickness, with which limits are imposed on reduction in size of the components.

The object of the present invention consisted in producing a biaxially-oriented polypropylene film, which contributes to improved usage properties of the condensers manufactured out of it. In particular, improvement (raising) of the electrical breakdown voltage accompanied by a better temperature stability of the condensers is a constant requirement in the professional world.

For production of film condensers, the films are generally initially metallised and subsequently wound. Metallisation of the film itself already includes a temperature load, which film must withstand, i.e. dimensional changes must not come about in the film during metallisation.

It was found that, in particular in so-called performance condensers for local high-voltage uses in the interior of the condenser, extreme temperatures could arise in local areas through flowing currents or discharge processes between film layers, so-called hot spot temperatures. Here, according to present Investigations, temperatures of clearly over 120° C., up to 14000 are reached incrementally. So the film is subjected to raised temperatures both during the treatment to the metallised reel and during the use of the condenser.

This object formulated above is achieved according to the invention by a multilayer, biaxially-oriented electrical insulating film, which is made up of a base layer and at least one covering layer, wherein the base layer contains a mixture of a polypropylene P1 and a different polypropylene P2, wherein the polypropylene P1 is a linear polypropylene and has a mesopentadene isotaxy of at least 95% and the polypropylene P2 has a long chain branching.

The base layer of the film contains a mixture of at least two different polymers P1 and P2 and, if necessary, conventional additives in small quantities, like for example stabilisers and neutralisation agents. The first component P1 is a polypropylene, which is suitable for the manufacture of electrical insulating films due to its particular purity (low ash and chlorine content). This polypropylene is distinguished by a broad molecular weight distribution in combination with a high isotacticity. Structurally, this material has a linear chain structure, as is normally conventional in polypropylenes for films. The second component is a propylene polymer P2, which is structurally different from P1 and has long chain branching.

The base layer generally contains at least 95-100% by weight, preferably 98 to <100% by weight, in each case relative to the base layer, of the polymer mixture described below. The composition of the mixture can basically vary within a broad range. In general, it is preferred for the polymer P1 to make up the main component of the mixture, i.e. for the P1 portion to be >50 to <100% by weight, P2 correspondingly <50 to >0% by weight, in each case relative to the weight of the mixture. Mixtures consisting of 70-99% by weight P1 and 1-30% by weight P2, preferably 80-98% by weight P1 and 2-20% by weight P2, are preferred. Mixtures with 90-97% by weight P1 and 3-10% by weight P2 are particularly suitable.

All conventional polypropylene raw materials that are conventionally used for the production of electrical insulating films can be used as propylene polymer P1 of the mixture, as long as they fulfil the molecular weight distribution with an Mw/Mn>5 and a mesopentadene isotaxy of at least 95%. The propylene polymer P1 contains at least 98 to 100% by weight, in particular 99 to 100% by weight, propylene. The corresponding comonomer content of at most 2% by weight, or rather in particular 0 to 1% by weight, if available, generally consists of ethylene. The values in % by weight each refer to the propylene polymer. Propylene homopolymers are preferred.

The propylene homopolymer P1 has an Mw/Mn of >5, preferably >5 to 12, in particular 5.5 to 10, according to the invention. Mw/Mn is a value for the molecular weight distribution (determined by means of GPC) of the propylene polymers expressed as a ratio of the weight average Mw to number average Mn. The mesopentadene isotaxy preferably comes to 95-99.8%, in particular 96.5-99.5%. Surprisingly, the temperature stability of the breakdown voltage of the films improves by admixture of long-chain branched P2 polymers to a broadly distributed polymer, if the isotaxy of the broadly-distributed polymer P1 has a minimum value of at least 95%. It was originally expected that the broad distribution of the polymer P1 would adversely affect this temperature stability so much that the addition of long-chain branched polymer P2 could no longer compensate for this adverse effect. Surprisingly, the said addition brings the desired improvement even upon mixing with a broadly distributed polypropylene when a high isotaxy is given at the same time. If the isotaxy of the broadly-distributed polymer lies under 95%, then no improvement to the breakdown voltage is established by the addition of the long-chain branched polymer P2.

The polypropylene P1 of the base layer generally has a melting point of 155 to 170° C., preferably 160 to 167° C., and a melt flow index (measurement ISO 1133 at 2.16 kg load and 230° C.) of 0.7 to 15 g/10 min, preferably 1.0 to 8.0 g/10 min. The n-heptane-soluble portion of the polymer P1 generally comes to 0.2 to 4% by weight, preferably 1 to 2% by weight relative to the output polymer, corresponding to an isotactic portion (wherein for this the n-heptane-insoluble portion is taken as an isotactic portion) of 96 to 99.9%, preferably 97 to 99.8%. The average molecular weight Mw (weight average) of the polymer P1, determined by means of GPC, lies in the range of 200,000 and 800,000, preferably 400,000 to 650,000.

The chain isotaxy index determined by means of $^{13}$C-NMR-spectroscopy (triad method, henceforth "triad value") of the propylene homopolymers P1 comes to >95%, preferably from >95-99.9%, preferably >97 to 99.5%.

The polymer P1 is structurally different to polymer P2. It has a linear structure in contrast to the structure with chain branchings of the polymer P2.

With regard to the intended usage aim of the film according to the invention as condenser film, that propylene homopolymer P1 should have an ash content of <50 ppm, preferably between 10 and 40 ppm, and a chlorine content of at most 10 ppm, preferably >0-5 ppm.

The propylene polymers P2 of the mixture are distinguished by a special long-chain branched structure. The propylene polymer P2 contains at least 98 to 100% by weight, in particular 99 to 100% by weight, propylene units. The corresponding comonomer content of at most 2% by weight, or rather in particular 0 to 1% by weight generally consists, if available, of ethylene units. The figures in % by weight each relate to the propylene polymer. Propylene homopolymers are preferred.

The propylene polymer P2 generally has a melting point of 155 to 170° C., preferably of 160 to 167° C., and a melt flow index (measurement ISO 1133 at 2.16 kg load and 230° C.) of 0.7 to 20 g/10 min, preferably of 1.5 to 15 g/10 min. The n-heptane-soluble portion generally comes to 1 to 3% by weight, preferably 1 to 2% by weight relative to the output polymer, corresponding to an isotactic portion of 97 to 99%, preferably 98 to 99%. The average molecular weight Mw (weight average) of the P2, determined by means of GPC, lies in the range of 200,000 and 800,000, preferably 400,000 to 650,000. The molecular weight distribution (determined by means of GPC) of the propylene polymer P2 expressed as a ratio of the weight average Mw to the number average Mn generally lies between 2 and 11, preferably between 5 and 10.

The chain isotaxy index determined by means of $^{13}$C-NMR spectroscopy (triad method, henceforth "triad value") of the propylene polymer P2 comes to at least 92 to 99%, preferably 93 to 98%. Hence, for the purposes of the invention, both high-isotactic propylene polymers P2 with a triad value of 95-99% and propylene polymers with low isotaxy value, in which the triad value lies in the range of 92-<95%, can be introduced.

With regard to the intended usage aims of the film according to the invention as a condenser film, the propylene polymer P2 should have an ash content of <50 ppm, preferably between 10 and 40 ppm, and a chlorine content of at most 10 ppm, preferably >0-5 ppm, wherein if necessary higher impurities can be accepted if necessary, if P2 is added in comparably small quantities. Basically, the impurities of the individual components should be set up so that the mixture of P1 and P2 does not exceed the named upper limits for ash content of <50 ppm and chlorine content of at most 10 ppm.

According to the invention, the long-chain branched P2 is characterised by a special structure, i.e. it has long-chain branchings. The measure of the branching is determined by use of the weight-average branching index g' of the branched polymer. The weight-average branching index g' is defined as $g'=[IV]_{br}/[IV]_{lin}|M_w$, wherein g' stands for the weight-average branching index, $[IV]_{br}$ for the border viscosity of the branched polypropylene and $[IV]_{lin}$ for the border viscosity of the linear polypropylene with the same weight-average molecular weight as the branched polypropylene. In the art it is well known that with increasing g'-value the branching increases. See B. H. Zimm and W. H. Stockmayer, J. Chem. Phys. 17, 1301 (1949).

As a rule, the branching index g' of the propylene polymer P2 used for the present invention lies in the range of 0.60 to 0.90. The branching index g' of the propylene polymer P2 used for the films according to the invention preferably comes to less than 0.88, particularly preferably less than 0.85 and especially particularly preferably less than 0.80.

Production of Propylene Polymers P2 with g'≤0.90

The propylene polymers P2 can be obtained according to a series of methods, e.g. by treatment of the linear propylene polymer with thermally decomposing radical formers and/or by treatment with ionised radiation, wherein both methods can be accompanied or followed, if necessary, by a treatment with bi- or multi-functional ethylenically unsaturated monomers, e.g. butadiene, isoprene, dimethylbutadiene, divinylbenzene or trivinylbenzene. Further methods can be suitable for the production of the propylene polymer P2, provided that the propylene polymer P2 possesses the properties required according to g'. Long-chain polypropylene can also be somewhat obtained by polymerisation by use of metallocene catalysts.

Within the scope of the present invention, "bi-functional ethylenically unsaturated" or "bi-functional" is to be understood as the presence of two non-aromatic double-bonds, like e.g. in divinylbenzene or cyclopentadiene. Only such bi-functional ethylenically unsaturated compounds are used as can be polymerised with the help of free radicals. The bi-functional unsaturated monomer is not really "unsaturated" in its chemically bonded condition, as the two double bonds are each used for a covalent bond on the polymer chain of the linear polypropylene.

Examples of methods with which propylene polymers can be obtained with g'≤0.90, are particularly:

by conversion with bismaleicinimido compounds in polypropylene modified in the melts (EP 0 574 801 and EP 0 574 804)

by treatment with polypropylene modified by ionised radiation (EP 0 190 889 A2)

by treatment with peroxides in solid phase (EP 0 384 431 A2), or rather polypropylene modified in the melts (EP 0 142 724 A2)

by treatment with bi-functional ethylenically unsaturated monomers under the effects of polypropylene modified by ionising radiation (EP 0 678 527)

by treatment with bi-functional ethylenically unsaturated monomers in the presence of peroxides in polypropylene modified in the melts (EP 0 688 817 and EP 0 450 342).

As a rule, propylene polymers P2 with long-chain branchings are produced based on linear propylene polymers.

According to a preferred embodiment, the production is carried out by mixing the linear propylene polymer in particle form, with an effective quantity of an organic peroxide at a temperature of 30-100° C. The peroxide must be decomposable at higher temperatures and serves as a radical former. Preferred peroxides are acyl peroxides, alkyl peroxides, hydroperoxides, peresters and/or peroxycarbonates. The peroxides can be introduced in pure form or in solution in an organic solvent or in the form of a master batch.

Volatile bi-functional ethylenically unsaturated monomers are absorbed from the gas phase at temperatures of 20-120° C. and preferably 70-90° C. by the particle-shaped polymer. The quantity of bi-functional unsaturated monomers preferably comes to 0.01 to 10% by weight and particularly preferably 0.05 to 2% by weight relative to the weight of the polymer.

The mixture containing the peroxide and the bi-functional monomers is heated to a temperature of up to 210° C. and melted on, preferably in an atmosphere containing inert gas and/or volatile bi-functional monomers.

Finally, the melt is heated to 220-250° C. to remove unconverted monomers and decomposition products. The heating and melting on steps are preferably carried out in kneaders or extruders, preferably in twin screw extruders.

The molten propylene polymer with long chain branchings, is then cooled off and granulated.

The average sorption time of the volatile bi-functional monomers on the particle-shaped polymer advantageously comes to 10 to 1000 seconds, preferably 20 to 800 seconds and particularly preferably 60 to 600 seconds.

Examples of suitable organic peroxides are:

alkylperoxides, like benzene peroxide, 4-chlorobenzoylperoxide, 3-methoxybenzoylperoxide and/or methylbenzoylperoxide;

alkyl peroxides, like allyl-tert-butylperoxide, 2,2-bis(tert-butylperoxybutane), 1,1-bis=-(tert-butylperoxy)-3,3,5-trimethicyclohexane, n-butyl-4,4-bis(tert-butylperoxy)valerate, diisopropylaminomethyl-tert-amylperoxide, dimethylaminomethyl-tert-amylperoxide, diethylaminomethyl-tert-butylperoxide, dimethylaminomethyl-tert-butylperoxide, 1,1-di(tert-amylperoxy)cyclohexane, tert-amylperoxide, tert-butylcumylperoxide, tert-butylperoxide, and/or 1-hydroxybutyl-n-butylperoxide;

peresters and peroxycarbonates, like butylperacetate, cumylperacetate, cumylperpropionate, cyclohexylperacetate, di-tert-butylperadipate, di-tert-butylperazelate, di-tert-butylperglutarate, di-tert-butylperphthalate, di-tert-butylpersebazate, 4-nitrocumylperpropionate, 1-phenylethylperbenzoate, phenylethylnitropenbenzoate, tert-butylbicyclo-(2.2.1)heptanepercarbozylate, tert-butyl-4-carbomethoxyperbutyrate, tert-butylcyclobutanepercarboxylate, tert-butylcyclohexylperoxycarboxylate, tert-butyl-cyclopentylpercarboxylate, tert-butylcyclopropanepercarboxylate, tert-butyldimethylpercinnamate, tert-butyl-2-(2,2,-diphenylvinyl)perbenzoate, tert-butyl-4-methoxyperbenzoate, tert-butylperbenzoate, tert-butylcarboxycyclohexane, tert-butylpernaphthoate, tert-butylcarboxycyclohexane, tert-butylpernaphthoate, tert-butylperoxyisopropylcarbonate, tert-butylpertluate, tert-butyl-1-phenylcyclopropylpercarboxylate, tert-butyl-2-propylperpentene-2-oate, tert-butyl-1-methylcyclopropylpercarboxylate, tert-butyl-4-nitrophenylperacetate, tert-butylnitrophenylperoxycarbamate, tert-butyl-N-succinimidoperaroboxylate, tert-butylpercrotonate, tert-butylpermaleic acid, tert-butylpermethacrylate, tert-butylperoctoate, tert-butylpermaleic acid, tert-butylpermethacrylate, tert-butylperoctoate, tert-butylperoxyisopropylcarbonate, tert-butylperisobutyrate, tert-butylperacrylate and/or tert-butylperpropionate;

and mixtures of these peroxides.

Volatile, bi-functional monomers, which are advantageously used for the production of the propylene polymer with long-chain branchings, are, among others:

divinyl compounds, like divinylaniline, m-divinylbenzene, p-divinylbenzene, divinylpentane and/or divinylpropane;

allyl compounds like allylacrylate, allylmethacrylate, allylmethylmaleate and/or allylvinylether;

dienes, like butadiene, chloroprene, cylohexadiene, cyclopentadiene, 2,3-dimethylbutadiene, heptadiene, hexadiene, isoprene and/or 1,4-pentadiene;

and mixtures of these monomers.

Butadiene, isoprene, dimethylbutadiene and divinylbenzene are particularly preferred.

Within the scope of the present invention, it was found that mixing in the polymer P2 into the polymer P1 surprisingly contributed to the improvement of the electrical breakdown voltage, although the polymer P1 has a comparably broad molecular weight distribution. Films with a base layer made of the polymer mixture according to the invention are excellently suitable as condenser films. In comparison with known condenser films made of conventional polypropylene, the films according to the invention show a higher electrical breakdown voltage, which also remains very stable at increased temperatures and is clearly higher than in the condenser films according to the prior art.

In general, the base layer contains 95-100% by weight of the mixture described above, in particular 98-<100% by weight, in each case relative to the weight of the base layer, as well as conventional additives each in effective quantities if necessary, for example, neutralisation agents and stabilisers. Additives conventional in the packing film sector, like anti-blocking agents, static inhibitors, lubricants and pigments are generally not added in terms of use as condenser films.

The conventional stabilising compounds for ethylene, propylene and other α olefin polymers can be added as stabilisers. Their additional quantity lies between 0.05 and 2% by weight. Phenolic stabilisers, alkali/earth alkali stearates and/or alkali/earth alkali carbonates are particularly suitable. Phenolic stabilisers are preferred in a quantity of 0.05 to 0.6% by weight, in particular 0.1 to 0.5% by weight, and with a molar mass of more than 500 g/mol. Pentaerythrityl-tetrakis-3-(3,5-di-tertiarybutyl-4-hydroxy-phenyl)-propionate (Irganox 1010) or 1,3,5-trimethyl-2,4,6-tris(3,5-di-tertiarybutyl-4-hydroxybenzyl)benzene (Irganox 1330) or 3,5-di-tert-butyl-4-hydroxytoluol (BHT) are particularly advantageous.

The neutralisation agent is preferably calcium stearate, wherein if necessary other conventional neutralisation agents, which do not adversely affect the dielectric properties of the film, can also be introduced. In general, neutralisation agents are added in a quantity of 0.001 to 0.5% by weight, preferably between 0.005 and 0.1% by weight. The figures in % by weight each relate to the weight of the base layer.

The polypropylene film according to the invention comprises at least one covering layer(s), two-sided if necessary, made of polypropylene, which generally contain(s) at least 95% by weight, preferably 99 to 100% by weight, in each case relative to the covering layer, of a propylene polymer or the mixture according to the invention.

In some applications, condensers are pressed flat, in order to enable a space-saving installation. In this area, electrical insulating films with raised surface roughnesses are desirable, in order to guarantee a good construction of the reel. In these applications, therefore, those films according to the invention are preferred which have covering layers on one or both sides, which are essentially only made up of propylene polymers corresponding to the P2 described above. These embodiments therefore have 95 to <100% by weight, relative to the weight of the covering layers of the propylene polymer P1 described above, as well as stabilisers and neutralisation agents if necessary.

In a further embodiment, the polypropylene of the covering layer(s) can also have a Mw/Mn of <5 and/or a mesopentadene isotaxy of <95%, i.e. be different to P1 in this respect. In this case, Mw/Mn values of 1 to 4 and/or isotaxy values of 95 to 98% are preferred for the polypropylene. Incidentally, the properties and the structure correspond to the propylene polymer P1. Surprisingly, these multilayer films show an improved breakdown voltage, even though the polymer P2 improving the temperature stability is only introduced in the base layer of the film.

In a further embodiment, the film has covering layers of the mixture of P1 and P2 described above on one or both sides, i.e. the covering layers contain 95-100% by weight of the mixture described above for the base layer. These embodiments are distinguished by a low haze and a comparably glazed surface and are comparably well suited for use as condensers according to the invention.

If necessary, the neutralisation agents and/or stabilisers described above for the base layer can be added to the covering layer(s). In a preferred embodiment, the covering layers also contain no conventional additives like anti-blocking agents, static inhibitors, lubricants and pigments with regard to use as condenser films.

The thickness of the covering layer(s) is greater than 0.1 μm and preferably lies in the range from 0.3 to 5 μm, in particular 0.4 to 3 μm, wherein two-sided covering layers can be the same or different thicknesses.

The total thickness of the polypropylene film can vary within broad limits and depends on the intended use. It preferably comes to 1 to 20 μm, preferably 2.5 to 15 μm, wherein the base layer makes up around 40 to 100% of the total thickness. It was found that thinnest films with thicknesses of <5 μm, preferably <3 μm, can be particularly advantageously produced out of mixtures according to the invention. The improved breakdown voltage makes it possible to further reduce the thickness of the film while maintaining a constant electrical capacitance. In this way, the miniaturisation of condenser components is further promoted. In uses with conventional thicknesses, the increased breakdown voltage likewise offers important advantages.

The invention furthermore concerns a method for the production of the polypropylene film according to the invention according to the coextrusion method known in itself.

Within the scope of this method, the procedure is that the melts corresponding to the individual layers of the film are coextruded through a flat die, the film so obtained is pulled off on one or several rollers for hardening, the film is subsequently biaxially stretched (oriented), the biaxially-stretched film is heat-set and, if necessary, corona- or flame-treated on the surface layer(s) provided for metallisation.

The biaxial stretching (orientation) is generally carried out sequentially, wherein the sequential biaxial stretching, in which first stretching is carried out first longitudinally (in the machine direction) and then laterally (perpendicular to the machine direction), is preferred. A simultaneous stretching in the longitudinal and lateral direction is basically also possible.

Initially, as is conventional in the extrusion method, the polymer, or rather the polymer mixture of the individual layers, is compressed in an extruder and liquefied, wherein the additives added if necessary can already be contained in the polymer, or rather in the polymer mixture. The melts are then simultaneously pressed through a flat die (sheet extrusion die), and the multilayer film pressed out is pulled out on one or several outfeed rollers, wherein it cools off and hardens.

The film so obtained is then stretched along and across the direction of extrusion, leading to an orientation of the molecule chains. The longitudinal stretching will be carried out advantageously with the help of two rollers running at different speeds corresponding to the desired stretch ratio, and the lateral stretching with the help of a corresponding clip frame. The longitudinal stretch ratios lie in the range of 3.0 to 8.0, preferably 4.0 to 6.5. The lateral stretch ratios lie in the range from 6.0 to 10.0, preferably between 7 and 9.5.

Following the biaxial stretching is its heat setting (heat treatment), wherein the film is held for around 0.1 to 10 s long at a temperature of 100 to 160° C. Then the film is wound up in the conventional manner with a winding device.

It has proven particularly beneficial to hold the outfeed roller or rollers, through which the film pressed out is cooled off and hardened, through a heating and cooling circuit at a temperature from 30 to 120° C., preferably between 60 and 100° C. The increased outfeed roller temperatures help the formation of β-spherulites in the prefilm. These β-spherulites generate the desired surface roughness for electrical films required by the method, as described in EP-A-0 497 160.

Before the prefilm cooled in this way is fed into the longitudinal stretching unit, it is conventionally preheated to a temperature of 110-160° C., preferably to 120-150° C. This pre-heating can be carried out by means of heated rollers, basically, however, also with other established methods like e.g. IR radiators, heated air etc.

The temperatures at which longitudinal and lateral stretching is carried out depend on the desired properties, in particular on the surface roughness of the film to be generated. In general, the longitudinal stretching is carried out at 120 to 160° C., preferably 130-160° C., and the lateral stretching at 140 to 180° C., preferably 150-170° C.

After the biaxial stretching, preferably one or both surface(s) of the film is/are corona-, plasma- or flame-treated. The treatment intensity generally lies in the range from 34 to 50 mN/m, preferably 36 to 45 mN/m.

In corona treatment, the advantageous procedure is for the film to be conveyed between two conducting elements acting as electrodes, wherein between the electrodes a voltage, mostly an alternating voltage (around 5 to 20 kV and 5 to 30 kHz), is applied which is so high that spray or corona discharges could take place. Because of the spray or corona treatment, the air above the film surface ionises and reacts with the molecules of the film surface, so that polar buildups can arise it the essentially non-polar polymer matrix.

For flame treatment with polarised flame (cf. U.S. Pat. No. 4,622,237), an electric alternating voltage is applied between a burner (negative pole) and a cooling roller. The level of the voltage applied comes to between 400 and 3000 V, it preferably lies in the range from 500 to 2000 V. Through the voltage applied, the ionised atoms obtain an increased acceleration and collide with the polymer surface with greater kinetic energy. The chemical bonds inside the polymer molecule are easier broken up, and the radical formation passes off faster. The thermal load of the polymer is here much smaller than in the standard flame treatment without application of a voltage, which is also suitable for pretreatment of the surface.

The following measuring methods were used for characterisation of the raw materials and the film:

Melt Flow Index

The melt flow index was measured according to ISO 1133 at 2.16 kg load and 230° C.

Melting Point

DSC measurement, maximum of the melt curve, heating speed 10 K/min.

Shrinkage:

The longitudinal and lateral shrinkage values relate to the particular extension in length of the film (longitudinal $L_0$ and lateral $Q_0$) before the shrinking process. The longitudinal direction is the machine direction, the lateral direction is correspondingly defined as the direction perpendicular to that in which the machine runs. The sample of 10*10 cm² is shrunk in a circulating air oven at the particular temperature (of 100 to 140° C.) over a period of 15 min. Then the remaining length extensions of the sample are once again determined longitudinally and laterally ($L_1$ and $Q_1$). The shrinkage in % is then given as the difference of the length extensions ascertained in relation to the original lengths $L_0$ and $Q_0$ times 100.

Longitudinal shrinkage $L_S[\%]=(L_0-L_1)/L_0*100[\%]$

Lateral shrinkage $Q_S[\%]=(Q_0-Q_1)/Q_0*100[\%]$

This method of determining the longitudinal and lateral shrinkage corresponds to DIN 40634.

Dielectric Loss Factor

Measurement of the dielectric loss factor (tan α) is carried out according to VDE 0303, part 4. The film samples are metallised on both sides with aluminium in a vacuum metallisation device before measurement. The size of the measuring surface F (=metalised surface) depends on the film thickness d:

For a film thickness d of ≤10 μm an area of 1 cm²

For a film thickness d of >10 μm an area of 5 cm²

A double determination is carried out on every sample to be tested, and an average value calculated. The samples are laid in a drying cupboard. The lower electrode plate consists of brass. The upper electrode is cylindrical and likewise consists of brass. The test voltage comes to 1V. The measurement is carried out at three frequencies, of 0.1 KHz, 1 KHz and 10 KHz.

Residual Ash Content:

In order to measure the residual ash content, the portion of non-combustible fillers was quantitatively determined. The residual ash content (ignition loss) is calculated from the output weight of the sample and the ignition residue. The result measured is given in ppm. A representative control sample of approx. 1 kg is taken from the material to be tested (granulate, regenerate etc.). The material has to be clean and completely dry; a pre-drying at approx. 80° C. in the circulating air heating cabinet may be required. Three empty porcelain crucibles are heated for at least 1 h at a temperature of 650° C. in the crucible furnace and, after cooling off to room temperature in the desiccator, are weighed to within 0.1 mg accuracy. The heating is repeated until parity of weight is achieved between two successive weighings. Afterwards 50 g (±0.1 g) of material is weighed into every crucible, and put into the 650° C. muffle furnace. The temperature in the oven is now increased to 1000° C. and heating goes on at this temperature for at least 1 h. After cooling off the crucible in the desiccator it is weighed to within 0.1 mg accuracy. The ash content is given in the unit ppm (parts per million)=mg/m³. All three crucibles are evaluated according to the following formula, and the two values differing the least are combined to an average value:

ppm=output weight (g)/input weight (g)×1000000

Chlorine Content

The chlorine content in polyolefins is measured quantitatively by means of radiographic fluorescence analysis (RFA) according to DIN 51 001, part 1. A tablet is pressed out of granulate/powder, and is calibrated with the RFA against a calibration curve. The calibration curve was set up with the help of 10 calibration samples, in which the chlorine content was determined according to an independent method (wet technical). (Values for the chlorine content of under 5 ppm are not given numerically for reasons of precision, value<5 ppm).

Border Viscosity

Determination of the border viscosity was carried out according to ISO 1628-3 in dekalin at 135° C.

Determination of Molecular Weight

The average molar mass and the average molar mass dispersion were determined relying on DIN 55 672, part 1, by means of gel permeation chromatography. Instead of THF, orthdichlorobenzene was used as an elution agent. As the homopolymers to be investigated are not soluble at room temperature, the overall measurement is carried out at an increased temperature (at 135° C.).

Isotactic Portion

The isotactic portion of the homopolymer can be approximately characterised by the insoluble fraction of the raw material in n-heptane. Conventionally, a soxlet extraction is carried out with boiling n-heptane, wherein it is advantageous to fill the soxlet with a pellet instead of granulate. The thickness of the pellet should hereby not exceed 500 micrometers. It is of decisive importance to the quantitative ascertainment of the ne-heptane-insoluble portion of the homopolymer that a sufficient extraction time of 8 to 24 hours is guaranteed.

The operational definition of the isotactic portion $PP_{iso}$ in percent is given by the ratio of the weight of the dried n-heptane-insoluble fraction to the input weight:

$PP_{iso}$=100×(n-heptane-insoluble fraction/input weight)

An analysis of the dried n-heptane extract shows that this does not consist of purely atactic propylene homopolymers, as a rule. In extraction, aliphatic and olefinic oligomers, in particular isotactic oligomers, as well as possible additives like e.g. hydrated hydrocarbon resin and wax are also established as well.

Determination of the Triad-Related Chain Isotaxy Index II (Triads)

Tests Preparation and Measurements 60 to 100 mg polypropylene are weighed in to 10 mm NMR test tube. After addition of a solvent made up of hexachlorobutadiene ($C_4Cl_6$) and deuterated tetrachloroethane ($C_2D_2Cl_4$), the suspension is maintained at approx. 140° C. for as long as it takes until a homogeneous solution emerges. The dissolution method is accelerated by stirring with a glass rod. The absorption of the $^{13}$C-NMR spectrum takes place at a raised temperature (as a rule, 373 K) under standard conditions (half-quantitatively).

Evaluation of the $^{13}$C-NMR Spectrum

In order to describe the configuration statistics (clock time) of polypropylene, three monomer units are combined to triads. In a triad, is observed the configuration of the neighbouring methyl groups from the middle methyl group. If all three methyl groups have the same configuration, then it is an mm-triad.

If the configuration of the previous and following methyl groups is the same, but different to the middle $CH_3$ group, then it is an rr-triad.

Two further arrangements are possible: mr and rm. However, they cannot be distinguished, as both directions along the polymer chain are of equal value. They are summarised as mr-triads.

The various triads can be distinguished by their different chemical displacement in the $^{13}$C-NMR spectrum.

Range of the mm-triads approx. 20.8-approx. 22.2 ppm
Range of the mr-triads approx. 20.0-approx. 20.8 ppm
Range of the rr-triads approx. 19.2-approx. 20.0 ppm The intensities of the triad signals are compared for calculation of the so-called triad-related chain isotaxy index II:

$$II \text{ (triads)} = (I\ mm + 0.5I\ mr)/(I\ mm + mr + I\ rr) * 100$$

Wherein I mm, I mr and I rr are the integrals of the allocated signal groups.

REFERENCE

*NMR-spectroscopy and polymer microstructure* by Alan E. Tonelli, 1989, VCH

Determination of the Mesopentadene Isotaxy (Also Called Mesopentadene Fraction (mmmm))

Determination of the mesopentadene isotaxy is carried out as in the following publications: T. Hayashi, Y. Inoue, R. Chujo and T. Asakura, Polymer 29 138-43 (1988), as well as Chujo R, et al, Polymer 35 339 (1994). The $C^{13}$ NMR specra were measured with a Bruker 400 MHz spectrometer at 130° C. The samples were dissolved in 1,2,4-trichlorobenzene/benzene-D6 (90/10 w/w).

The invention is now described on the basis of the following exemplary embodiments:

EXAMPLE 1

A transparent, single-layer film with a total thickness of 7.0 μm was produced by extrusion and subsequent stepwise orientation in the longitudinal and lateral directions. The layer had the following composition:

approx. 95% by weight high-isotactic polypropylene P1 from the Borealis company (name: Borcelan® HB 300Bf)

approx. 5% by weight P2 (HMS)
0.45% by weight phenolic stabiliser Irganox 1010
0.0075% by weight neutralisation agent Ca stearate.

The high-isotactic polypropylene P1 had a mesopentadene isotaxy, measured by means of $^{13}$C-NMR-spectroscopy, of 97.4, a chlorine content of <5 ppm and an ash content of 20 ppm. The n-heptane insoluble portion of the polypropylene came to 1.7% (isotactic portion PP iso 98.3%). The average molecular weight Mn came to 64,600 g/mol and Mw 392,150 g/mol (measured by means of GPC) corresponding to a molecular weight distribution Mw/Mn of 6.07. The melt flow index MFI (230° C. and 2.16 kp) came to 1.45 g/10 min and the melting point 165° C.

Production of Propylene Polymer P2 with Branching Index≤0.90

In a first step, a linear propylene polymer is produced in a single-step propylene polymerisation in a loop-type bubble column. A Ziegler-Natta catalyst was used; the reaction temperature came to 70° C. The concentration of propylene and hydrogen was chosen so that an $MFI_{230/2.16}$ of 5.0 g/10 min resulted.

Powder obtained from the above polymerisation method is loaded at 100° C. for 15 minutes with 0.25% by weight tert-butylperoxyisopropylcarbonate and 0.5% by weight butadiene. The mixture is heated to a temperature of 200° C. in an inert atmosphere (nitrogen) and then further heated to 230° C. and then granulated. The polymer P2 obtained shows an $MFI_{230/2.16}$ of 7.2 g/10 min and a branching index g' of 0.8.

The production conditions in the individual methodological steps for production of the biaxially-oriented film were:
Extrusion: temperatures 250° C.
Temperature of the outfeed roller: 86° C.
Longitudinal stretching: preheating temperature: 136° C.
Longitudinal stretching temperature: 148° C.
Longitudinal stretch ratio: 5.0
Lateral stretching: temperature: 163° C.
Lateral stretch ratio: 9.6
Setting: temperature: 130° C.
Convergence: 12.5%

The lateral stretch ratio given is an effective value. This effective value can be calculated from the end film area, reduced by twice the edge band width, divided by the width of the longitudinally-stretched film, which is likewise reduced by twice the edge band width.

EXAMPLE 2

A film as described in example 1 was produced. Only the composition of the layer was changed. The portion of P2 was increased to 10% by weight relative to the layer, the P1 portion correspondingly came to 90% by weight. The conditions on production of the film were not changed.

COMPARATIVE EXAMPLE 1

A film was produced as described in example 1. Only the composition of the layer was changed. The layer now consisted only of the high-isotactic polypropylene P1 with stabiliser and neutralisation agent. The conditions upon production of the film were not changed.

COMPARATIVE EXAMPLE 2

A film was produced as described in example 1. Instead of the high-isotactic polypropylene P1 with a Mw/Mn of 6.07, a polypropylene with an isotaxy of approx. 93% and a Mw/Mn of approx. 6. The quantity ratios of the components P1 and P2 were not changed. The conditions upon production of the film were likewise not changed.

TABLE 1

| BDV in V/μm | Example 1 | | Example 2 | | Comparative example | |
|---|---|---|---|---|---|---|
| Voltage temperature | Alternating voltage | Direct voltage | Alternating voltage | Direct voltage | Alternating voltage | Direct voltage |
| 23° C. | 550 | 855 | 537 | 825 | 459 | 835 |
| 100° C. | 514 | 813 | 415 | 746 | 374 | 664 |
| 125° C. | 356 | 734 | | | 310 | 615 |

The invention claimed is:

1. A biaxially-oriented electrical insulating film comprising a base layer and at least one covering layer, wherein said base layer comprises a mixture of a polypropylene P1 and a different polypropylene P2, wherein said polypropylene P1 is a linear polypropylene and has an Mw/Mn of greater than 5 and a mesopentadene isotaxy in the range of from 96.5% to 99.5% and said polypropylene P2 has
 (i) a long-chain branching, and wherein the branching index g' of said polypropylene P2 is in the range of from 0.6 to 0.8,
 (ii) an average molecular weight Mw of polymer P2, determined by means of GPC is in the range of 400,000 to 650,000,
 (iii) has a ratio Mw/Mn of greater than 5 to 10,
 (iv) has a triad-related chain isotaxy index of 93 to 98%,
 (v) has an ash content of 10 to 40 ppm, and
 (vi) a chlorine content of greater than 0 to 5 ppm and
wherein the base layer further contains an additive selected from the group consisting of a neutralization agent and a stabilizer.

2. The biaxially-oriented electrical insulating film of claim 1, wherein said base layer comprises from 95 to 100% by weight of said mixture.

3. The biaxially-oriented electrical insulating film of claim 1, wherein said mixture comprises from 50 to less than 100% by weight of said polypropylene P1 and up to 50% by weight of said polypropylene P2.

4. The biaxially-oriented electrical insulating film of claim 3, wherein said mixture comprises from 70 to 99% by weight of said polypropylene P1 and from 1 to 30% by weight of said polypropylene P2.

5. The biaxially-oriented electrical insulating film of claim 1, wherein said polypropylene P1 has a triad-related chain isotaxy index of greater than 95%.

6. The biaxially-oriented electrical insulating film of claim 1, wherein said polypropylene P1 has a triad-related chain isotaxy index in the range of from 95 to 99.9%.

7. The biaxially-oriented electrical insulating film of claim 1, wherein said mixture has an ash content of less than 50 ppm and a chlorine content of no more than 10 ppm.

8. The biaxially-oriented electrical insulating film of claim 7, wherein said mixture has an ash content in the range of from 10 to 40 ppm and a chlorine content of up to 5 ppm.

9. The biaxially-oriented electrical insulating film of claim 1, wherein said film comprises a covering layer comprising propylene polymer P1 on at least one side.

10. The biaxially-oriented electrical insulating film of claim 9, wherein said film comprises a propylene polymer P1 covering layer on both sides.

11. The biaxially-oriented electrical insulating film of claim 1, wherein said film comprises a covering layer comprising a mixture of propylene polymer P1 and propylene polymer P2 on at least one side.

12. The biaxially-oriented electrical insulating film of claim 11, wherein said film comprises a covering layer comprising a mixture of propylene polymer P1 and propylene polymer P2 on both sides.

13. The biaxially-oriented electrical insulating film of claim 12, wherein the average molecular weight Mw of polymer P1, determined by means of GPC is in the range of 400,000 to 650,000.

14. The biaxially-oriented electrical insulating film of claim 13, wherein said polypropylene P1 is a linear polypropylene and has an Mw/Mn of greater than 5 to 10.

15. The biaxially-oriented electrical insulating film of claim 14, wherein said base layer comprises from 95 to 100% by weight of said mixture and said mixture comprises from 70 to 99% by weight of said polypropylene P1 and from 1 to 30% by weight of said polypropylene P2 and said polypropylene P1 has a triad-related chain isotaxy index in the range of from 95 to 99.9%.

16. The biaxially-oriented electrical insulating film of claim 1, wherein said film is metallised on its surface on one or both sides.

17. The biaxially-oriented electrical insulating film of claim 1, wherein said film has a thickness of no more than 20 μm.

18. A condenser comprising the biaxially-oriented electrical insulating film of claim 1.

19. The biaxially-oriented electrical insulating film of claim 1, wherein said polypropylene P1 is a linear polypropylene and has an Mw/Mn of greater than 5 to 10.

20. The biaxially-oriented electrical insulating film of claim 1, wherein the base layer contains a neutralization agent and a stabilizer and wherein the stabilizer is selecting from the group consisting of a phenolic stabilizer, an alkali/earth alkali stearate or alkali/earth alkali carbonate.

21. The biaxially-oriented electrical insulating film of claim 1, wherein the covering layers also contain no additives selected from the group consisting of anti-blocking agents, static inhibitors, lubricants and pigments.

* * * * *